(12) United States Patent
Houston et al.

(10) Patent No.: US 9,420,043 B2
(45) Date of Patent: Aug. 16, 2016

(54) SYSTEM AND METHOD FOR WIRELESS PACKET CAPTURE USING MOBILE COMMUNICATION DEVICES

(71) Applicant: Northrop Grumman Systems Corporation, Falls Church, VA (US)

(72) Inventors: Samuel C. Houston, Georgetown, TX (US); Leigh M. Henager, Elgin, OK (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 95 days.

(21) Appl. No.: 14/082,965

(22) Filed: Nov. 18, 2013

(65) Prior Publication Data
US 2014/0140233 A1   May 22, 2014

Related U.S. Application Data

(60) Provisional application No. 61/728,026, filed on Nov. 19, 2012.

(51) Int. Cl.
H04W 4/00 (2009.01)
H04L 29/08 (2006.01)
H04M 1/725 (2006.01)

(52) U.S. Cl.
CPC ............. *H04L 67/12* (2013.01); *H04L 67/10* (2013.01); *H04L 67/04* (2013.01); *H04M 1/72522* (2013.01); *H04W 4/006* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,068,011 B1* | 11/2011 | Sajadi et al. | ................ | 340/10.4 |
| 8,121,618 B2* | 2/2012 | Rhoads et al. | ............ | 455/456.1 |
| 8,199,014 B1* | 6/2012 | Kindeberg | ................ | 340/572.1 |
| 8,813,189 B2* | 8/2014 | Li | ...................... | H04L 63/0281 |
| | | | | 713/155 |
| 8,918,098 B2* | 12/2014 | Rivera | ................... | H04L 63/00 |
| | | | | 370/252 |
| 2003/0157895 A1* | 8/2003 | Agrawal | ................ | H04L 43/18 |
| | | | | 455/67.11 |
| 2007/0234215 A1* | 10/2007 | Graham et al. | ............... | 715/723 |
| 2012/0322380 A1* | 12/2012 | Nannarone et al. | ......... | 455/41.2 |

OTHER PUBLICATIONS

Gehring, Packet Analysis Using Wireshark, Florida Gulf Coast University, 28 pages, Dec. 2011.*
Diaz et al, Mobile Application Profiling for Connected Mobile Devices, IEEE, 8 pages, 2010.*
Gomez et al, SymPA: a Measurement Tool for Evaluating the Performance of IP Services in Mobile Networks, ACM, 4 pages, 2009.*

* cited by examiner

*Primary Examiner* — Frank Duong
(74) *Attorney, Agent, or Firm* — Andrews Kurth LLP; Sean S. Wooden

(57) ABSTRACT

A system and method for wireless packet capture using mobile communication devices such as commercial off-the-shelf (COTS) mobile communication devices is disclosed. Embodiments provide mobile communication device users the ability to collect wireless packet data for digital communications on COTS hardware and share the data amongst multiple devices for collection, processing, and geo-location without custom interfaces and external sensor devices.

28 Claims, 2 Drawing Sheets

SYSTEM AND METHOD FOR WIRELESS PACKET CAPTURE USING MOBILE COMMUNICATION DEVICES

BACKGROUND

It is increasingly difficult to use commercial off-the-shelf (COTS) communication devices (e.g., mobile phones) as sensors. Device manufacturers do not support this type of activity due to the complexity of the problems associated with massive data storage and battery usage, not to mention the fact that the general user of a COTS communication device has no need for this type of functionality.

As a result, companies had to develop custom interfaces to onboard modems on the COTS communication devices and provide local operating system support for external sensor devices connected to the COTS communication devices (e.g., as slaves via the SDIO connector). What is needed is a system and method that provides a mobile communication device user the ability to collect packet data for digital communications on COTS hardware and share the data amongst multiple devices for collection, processing, and geo-location without custom interfaces and external sensor devices.

These and other advantages of the present invention will become more fully apparent from the detailed description of the invention hereinbelow.

SUMMARY

Embodiments are directed to a method for wireless packet capture using a mobile communication device. The method comprises launching an application on a mobile communication device, wherein the application provides a user interface for providing a user with various selections to make regarding wireless packet capture and for receiving user input regarding wireless packet capture on the mobile communication device. The method also comprises receiving user input regarding wireless packet capture entered directly into the user interface on the mobile communication device that specifies one or more functions to be performed. The method further comprises capturing wireless packets, processing the captured wireless packets, and storing the processed wireless packets.

The one or more functions to be performed may include placing the mobile communication device into a wireless packet capture mode. The wireless packet capture mode is preferably a mode selected from the group consisting of Normal, Promiscuous, and Radio Frequency Monitor (RFMON). The Normal mode allows wireless packets to be captured only when the mobile communication device is associated with an access point and when the mobile communication device has a destination address associated with a client. The Promiscuous mode allows wireless packets to be captured only when the mobile communication device is associated with an access point, regardless of a destination address. The RFMON mode allows wireless packets to be captured from all access points, clients, and ad-hoc networks transmitted in a particular band, regardless of a destination.

The one or more functions to be performed preferably includes selecting whether to capture wireless packets from an on-board modem or a remote sensor device. The method further comprises detecting an active remote sensor device if the selecting selects capturing wireless packets from the remote sensor device. The capturing wireless packets includes capturing wireless packets through a remote sensor device or through an on-board modem.

The method yet further may comprise downloading the application onto the mobile communication device. Alternatively, instead of an application effecting wireless packet capture downloaded onto a communication device, embodiments herein could utilize a purpose-built communication device.

Embodiments are also directed to a non-transitory computer readable medium storing instructions, executable by a processor, for wireless packet capture using a mobile communication device, by the above method and/or portions thereof.

BRIEF DESCRIPTION OF THE DRAWINGS

For the present invention to be clearly understood and readily practiced, the present invention will be described in conjunction with the following figures, wherein.

DETAILED DESCRIPTION

Figure 1:
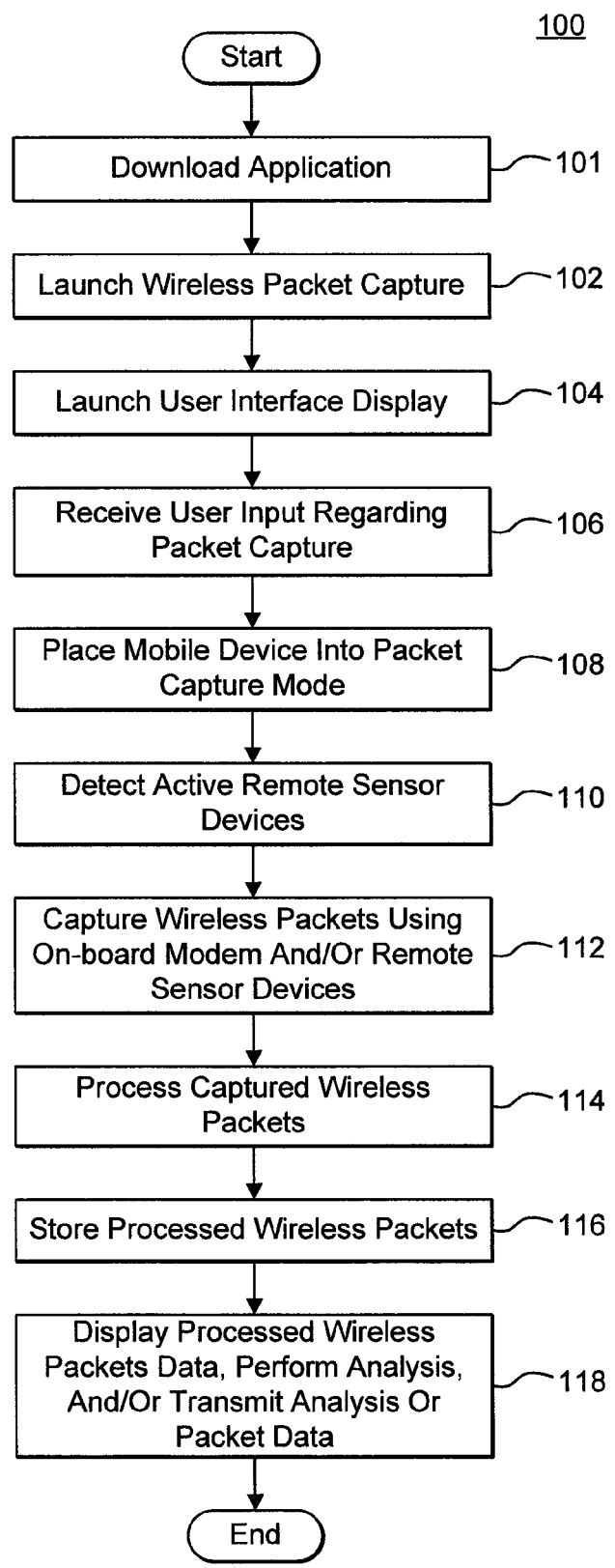
FIG. 1 is a flowchart illustrating an embodiment of a method for wireless packet capture.

It is to be understood that the figures and descriptions of the present invention may have been simplified to illustrate elements that are relevant for a clear understanding of the present invention, while eliminating, for purposes of clarity, other elements found in a typical communication device, typical wireless packet capture system, or typical wireless packet capture method. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will now be made to the drawings wherein like structures are provided with like reference designations.

Throughout this disclosure, the capturing of wireless packets includes the capturing of wireless packets transmitted from a third party that are intentionally destined for direct receipt by the communication device and/or includes the capturing of wireless packets surreptitiously intercepted that were intended to be transmitted between (i.e., to and/or from) third parties.

Described herein are embodiments of a system and method for wireless packet capture using mobile communication devices such as commercial off-the-shelf (COTS) mobile communication devices. Embodiments provide mobile communication device users the ability to collect wireless packet data for digital communications on COTS hardware and share the data amongst multiple devices for collection, processing, and geo-location without custom interfaces and external sensor devices.

Embodiments provide mobile communication device users the ability to conduct network collection and analytics on a covert/concealable form factor. An embodiment provides an application package intended to provide the users with an integrated, net-centric, and interoperable computer network operations (CNO) tool-kit which fully exploits the COTS mobile communication devices with a device agnostic design and development approach.

An embodiment is a mobile communication device application (e.g., a smart-phone application) which places a mobile communication device (e.g., an Android™-based or iPhone™-based smart-phone or tablet—e.g., an Android™ tablet or iPad™) in a normal, promiscuous, or radio frequency monitor (RFMON) mode and ingests access point and client wireless packets through connecting to or without being associated with the access point. These modes are described as follows. Normal mode is a mode that allows wireless client devices to send and receive packets only when associated with an access point. In the normal mode, the client is only able to capture the packets associated with the access point with which it is associated and that have the destination address associated with the client. Promiscuous mode is a mode that allows the wireless client device to capture packets associated with the access point with which it is associated, regardless of the destination address. This mode can be used to capture packets destined for other clients or packets which are destined for the access point from other clients. This mode has restricted functionality, in that it requires the client capture device to be associated with the access point. RFMON mode is a mode that allows the wireless device to capture all traffic received in, for example, the IEEE 802.11 band. This mode does not have the restrictions associated with Normal or Promiscuous Modes, in that the capture interface can collect packets on all access points, clients, and ad-hoc networks transmitting in band, regardless of the destination address.

The feeds captured may be categorized using the application by the user via MAC address. The feeds may be provided to the user in an easy to use interface through the application, making the captured feed traffic helpful to the user.

Embodiments may leverage raw socket collection from both on-board modems (i.e., onboard the mobile communication device) and external chipsets (e.g., a remote, off-board radio-frequency (RF) sensor) over a custom USB host mode (USB on the go) connection or via, for example, wireless 802.11 g/n where the processing power of the mobile communication device as well as the RF collection capabilities are, in the case of the on-board modems, optimized. In the case of the external chipsets (remote sensors), the processing power and RF collection capabilities are off-loaded to a network operations tool-kit. A network operations tool-kit is a collection of external RF sensors which are leveraged to increase the collection capabilities of the devices when the on-board modem capabilities would be exceeded to perform a necessary function. This signal and data capture and processing may be accomplished using, e.g., the following hardware:

1. COTS chipsets: On-board COTS chipsets are used as a low cost method by creating custom drivers and firmware which are ported to the handsets which control these chipsets.

2. Light-Weight Penetration Testing Platform (LWPTP): Embodiments are a customized, off-board/external system, which combines the requisite chipsets to complete 802.11 and 802.15 monitoring and packet capture. This system also off-loads all signal processing to an off-board processor which deceases the processing requirements on the handset and increases overall battery life. Consequently, LWPTP systems extend the capabilities of COTS communication devices. Embodiments connect to the communication device via USB, WiFi or 4G LTE. An embodiment may utilize open source software and hardware, such as BeagleBone™ circuit boards and Ubertooth One™ hardware. Embodiments may include a BeagleBone single board computer, a four (4) port USB hub, two WiFi adapters (a host wireless access point (WAP) and an adapter for monitoring and exploit operations), Ubertooth One hardware to conduct Bluetooth monitoring and exploit operations, a rechargeable battery (e.g., 6600 mAh 5V battery), an external 12V barrel bulkhead connector for recharging the battery, a power LED, a rocker on/off switch, three external RP-SMA connectors for wireless antennas (WiFI+ Bluetooth) and GPS with internal antenna. Embodiments may also include a 4G LTE USB adapter, such as the Shock-wave USB dongle, a USB bulkhead connector for wired command and control, GPS with external antenna, and seven (7) port USB hub.

3. Multi-Function Software Defined Radio (MFSDR): Embodiments are an off-board/external Receive/Transmit Signal Processor (RTSP) digital signal processor which the system connects to for out-of-band transmissions (frequency range and waveforms associated with this device are classified between SECRET and Top Secret/Sensitive Compartmented Information (TS/SCI)). The MFSDR may comply with the U.S. Government's Joint Tactical Radio System. The MFSDR allows embodiments of the system and method for wireless packet capture using COTS communication devices to command and control a Radio Frequency (RF) receive/transmit capability which functions across a much wider part of the RF spectrum than would be ordinarily possible with a COTS communications device. Embodiments of the MFSDR may provide large, 200 MHz instantaneous bandwidth and ultra-fast scanning, and may communicate via the COTS communications device using type 1 secure, modified cellular communications via a C2 interface. The MFSDR embodiment may include a circuit card assembly (CCA) with a high performance microprocessor, FPGA and digital signal processing to support real time applications such as spectral analysis and modulation and demodulation. The signal processor may include a high speed analog to digital converter (ADC) and digital to analog converter (DAC) running at 500 MSPS. The ADC sample rate may enable 200 MHz of simultaneous frequency coverage allowing for the simultaneous detection of multiple signals covering large amounts of bandwidth. The DAC may be dual in-phase/quadrature (I/Q), well suited for generating a variety of arbitrary waveforms. The CCA may provide a wideband, fast tuning, full duplex (capable of simultaneous Rx and Tx) RF transceiver function. The Rx architecture may include gain control, RF and IF filtering, with selectable bandwidths. In embodiments, the transmit I/Q modulator allows for multi-carrier generation and complex waveforms across a wide band. Embodiments may include a removable power amplifier module. The power amp may include both Rx and Tx signal paths. Embodiments provide control interfaces for the power amp (switch drivers) and secondary power for the entire module. Embodiments support a battery interface, external power source, and monitoring circuitry. In embodiments, an interconnect CCA hosts the GPS and Clock master oscillator functions and provides physical interconnect between the various assembles. The interconnect may provide a routing of signals to the COTS communications device via a USB or other connection.

Data captured using any of the above may then be transferred directly from the socket to the wireless packet capture application, which allows the data to be ingested into the database through a specially designed filter that allows for maximum throughput. The filter collects raw socket data from the SDIO Bus on the client device handsets which comes from COTS chipsets, LWPTP, or MFSDR and aggregates the data into a data container. This approach reduces data latency on the device and increases throughput while reducing the processing requirements on the handset. Embodiments, therefore, allow COTS mobile communication devices to become signal sensors using both onboard modems and external RF devices.

The development of a synergistic user interface (UI) that can support both internal, on-board modem and/or external RF sensor devices in a common data model allows the mobile communication device to collect, store, process, and disseminate captured signal data sets efficiently and increases the collection capabilities of mobile communication devices to facilitate geo-location. Embodiments allow for much of the wireless packet data capture to be offloaded to external RF devices while still allowing the mobile communication device (i.e., the application running on the mobile communication device) to aggregate the data from off-board RF sensors. Likewise, the use of on-board modems as sensors have been leveraged through custom interface between the hardware and the UI which allows the mobile communication device user to collect, analyze, and geo-locate individual wireless transmitters using either the mobile communication device on-board modems or external RF devices. The design of the system is such that the data may be shared amongst mobile devices ad hoc or at a server of the user's choice allowing for maximum mission effectiveness and robustness.

With reference now to FIG. 1, shown is a flowchart illustrating a method 100 for wireless packet capture. Method 100 starts with the downloading of wireless packet capture application, block 101. Method 100 may include the launching or activation of wireless packet capture application, block 102. Application may launch user interface display, block 104. User interface display may provide user with various selections to make regarding wireless packet capture. For example, user interface display may ask user what mode of wireless packet capture to perform, whether to capture wireless packets from the on-board modem and/or from remote sensor devices (e.g., remote RF sensor devices), and to start the wireless packet capture. Method 100 may include, therefore, receiving user input (e.g., via user interface display), block 106. If user starts wireless packet capture, application places mobile device into a wireless packet capture mode, block 108. As discussed above, the capture mode may be a normal, promiscuous, or radio frequency monitor (RFMON) mode. If user selects to capture wireless packets from remote sensor devices, method 100 may include mobile communication device detecting remote sensor devices, block 110. Detecting 110 may involve scanning for remote sensor devices or simply involve, e.g., USB, pairing with remote sensor devices and may be done automatically upon launching 102 of application. Indeed, if already detected through USB pairing or otherwise, application may present active remote sensor devices to user through user interface.

Once placed in packet capture mode, selected by user or otherwise, application may cause mobile communication device to capture wireless packets through onboard modem and/or remote sensor devices, block 112. As discussed above, onboard modem may ingest access point and client wireless packets through connecting to or without being associated with the access point. Application then processes captured wireless packets through filter, block 114, as described above, and stores filtered wireless packets in on-board or remote database, block 116. Application may display filtered wireless packets data, may perform analysis and may transmit analysis or packet data as selected by user, block 118.

The embodiments described herein overcame numerous difficulties. Modifying some devices securely was not possible. Other devices were distributed without access to the radio interface layer (RIL) and did not allow for USB host mode. Accordingly, some embodiments include a custom USB controller that allows USB host mode and provides a user level application program interface (API) to the RIL that allows mobile communication devices to conduct wireless packet capture on 802.11 and conduct electromagnetic site survey on the cellular infrastructure. Other problems were limited storage on the devices, internal mobile communication device chipsets for 802.11 were not capable of full internet packet capture across the OSI stack, the SDIO BUS on mobile communication devices was not robust enough to handle massive amounts of data and becomes a choke point for data ingestion into the archive, and battery life was severely limited when all modems, Wi-Fi 802.11, Bluetooth 802.16, and cellular 2/3/4G, were active at one time. Embodiments overcome these problems.

Embodiments solve significant problems by reducing the necessary electronic equipment and processors a military or government organization is required to transport in order to conduct their respective surveillance missions. In an example, a military unit may have a tactical collection asset. This unit would carry transit cases full of electronics equipment plus batteries. In addition, if any one of these devices is lost or breaks while deployed forward, the team could wait days, weeks or perhaps have to complete the mission without the necessary equipment. Utilizing the present invention with a COTS mobile communication device as a platform would reduce the cost and time necessary to regain an operational capability through this software based approach leveraging COTS hardware.

Figure 2:
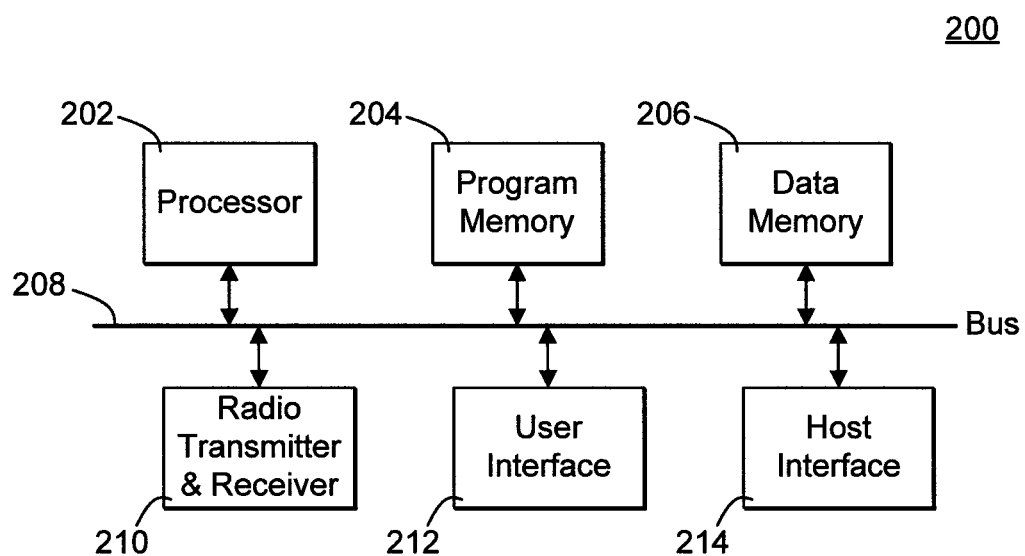
FIG. 2 is a block diagram illustrating exemplary components of a mobile communication device that implements an embodiment of a method for wireless packet capture.

With reference now to FIG. 2, shown is a block diagram of components of an exemplary mobile communication device 200 utilizing certain embodiments of the present disclosure, including execution of an application program that provides wireless packet capture and a user interface to such packet capture as described above. Device 200 comprises processor 202 that is operably connected to program memory 204 and data memory 206 via bus 208, which may comprise parallel address and data buses, serial ports, or other methods and/or structures known to those of ordinary skill in the art. Program memory 204 includes software code executed by processor to provide wireless packet capture according to the embodiments described herein (e.g., the smart-phone application described herein). Program memory 204 also includes software code executed by processor 202 that enables device 200 to communicate using one or more wired or wireless communication protocols, including one or more wireless communication protocols standardized by 3GPP, 3GPP2, or IEEE, such as those commonly known as LTE, UMTS, HSPA, GSM, GPRS, EDGE, 1xRTT, CDMA2000, 802.11, WiFi, HDMI, USB, Firewire, etc., or any other protocols utilized in conjunction with radio transceiver or modem 210, user interface 212, and/or host interface 214. Program memory 204 further includes software code executed by processor 202 to control the functions of device 200, including configuring and controlling various components such as radio transceiver 210, user interface 212, and/or host interface 214. Program memory 204 may also include an application program that causes display of user screen displays related to the capture of wireless packets and otherwise. Such software code may be specified or written using any known or future developed programming language, such as e.g. Java, C++, C, Objective C, HTML, XHTML, and Assembler, as long as the desired functionality, e.g., as defined by the implemented method steps, is preserved.

Data memory 206 may comprise memory area for processor 202 to store variables used in protocols, configuration, control, and other functions of device 200, including the capture of wireless packets and the display of one or more screen displays related to such capture. As such, program memory 204 and data memory 206 may comprise non-volatile memory (e.g., flash memory), volatile memory (e.g., static or dynamic RAM), or a combination thereof. Furthermore, data memory 206 may comprise a memory slot by which removable memory cards in one or more formats (e.g., SD Card, Memory Stick, Compact Flash) may be inserted and removed. Persons of ordinary skill in the art will recognize that processor 202 may comprise multiple individual processors (not shown), each of which implements a portion of the functionality described above. In such case, multiple individual processors may be commonly connected to program memory 204 and data memory 206 or individually connected to multiple individual program memories and or data memories. More generally, persons of ordinary skill in the art will recognize that various protocols and other functions of device 200 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio transceiver or modem 210 may comprise radio-frequency transmitter and/or receiver functionality that enables device 200 to communicate with other equipment supporting like wireless communication standards. Radio transceiver 210 may be used by application described herein to perform the wireless packet capture. In an exemplary embodiment, radio transceiver 210 includes an LTE transmitter and receiver that enable device 200 to communicate with various Long Term Evolution (LTE) networks (also known as "4G") according to standards promulgated by 3GPP. In some embodiments, radio transceiver 210 includes circuitry, firmware, etc. necessary for device 200 to communicate with various UMTS and/or GSM/EDGE networks, also according to 3GPP standards. In some embodiments, radio transceiver 210 includes circuitry, firmware, etc. necessary for device 200 to communicate with various CDMA2000 networks, according to 3GPP2 standards, as well as according to 4G standards. Radio transceiver 210 may also include HSDPA+ capability. In some embodiments, radio transceiver 210 is capable of communicating using radio technologies that operate in unlicensed frequency bands, such as IEEE 802.11 WiFi that operates in the ISM bands in the regions of 2.4 and 5.6 GHz. In some embodiments, radio transceiver 210 may comprise a transceiver that is capable of wired communication, such as by using IEEE 802.3 Ethernet technology. The functionality particular to each of these embodiments may be coupled with or controlled by other circuitry in device 200, such as processor 202 executing protocol program code stored in program memory 204.

User interface 212 may take various forms depending on the particular embodiment of device 200. In some embodiments, device 200 is a mobile phone, in which case user interface 212 may comprise a microphone, a loudspeaker, slideable buttons, depressable buttons, a display, a touchscreen display, a mechanical or virtual keypad, a mechanical or virtual keyboard, and/or any other user-interface features commonly found on mobile phones. In such mobile phone embodiments, the particular features comprising the device may depend on whether the device is a smartphone, feature phone, or other type of mobile phone. In other embodiments, device 200 is a tablet computing device (such as an iPad® sold by Apple, Inc.) comprising a touchscreen display that is much larger than touchscreen displays found on mobile phones. In such tablet embodiments, one or more of the mechanical features of user interface 212 may be replaced by comparable or functionally equivalent virtual user interface features (e.g., virtual keypad, virtual buttons, etc.) implemented using the touchscreen display of device 200, as familiar to persons of ordinary skill in the art. In other embodiments, device 200 may be a digital computing device, such as a laptop computer, desktop computer, workstation, etc. that comprises a mechanical keyboard that may be integrated, detached, or detachable depending on the particular embodiment. Such a digital computing device may also comprise a touch screen display. All embodiments of device 200 having a touch screen display are capable of receiving user inputs for selection and manipulation of content, such as inputs for selection and manipulation of content related to the capture of wireless packets.

In some embodiments, device 200 may comprise an orientation sensor, which can be used to sense when the user has changed the physical orientation of the device 200's touch screen display. An indication signal from the orientation sensor may be available to any application program executing on device 200, such that an application program may change the orientation of a screen display (e.g., from portrait to landscape) automatically when the indication signal shows a 90-degree change in physical orientation of the device. In this manner, the application program can maintain the screen display in a manner that is readable by the user, regardless of the physical orientation of the device.

Host interface 214 of device 200 also may take various forms depending on the particular embodiment of device 200. In embodiments where device 200 is a mobile phone, host interface 214 may comprise a USB interface, an HDMI interface, or the like. External RF sensors may communicate with mobile communication device 200 and application for wireless packet capture via the host interface 214.

In some embodiments, device 200 may comprise more functionality than is shown in FIG. 2. In some embodiments, device 200 may also comprise functionality such as a video and/or still-image camera, microphone, media player, etc. Moreover, radio transceiver 210 may include circuitry necessary to communicate using additional radio-frequency communication standards including Bluetooth, GPS, and/or others. Persons of ordinary skill in the art will recognize the above list of features and radio-frequency communication standards is merely exemplary and not limiting to the scope of the present disclosure. Accordingly, processor 202 may execute software code stored in program memory 204 to control such additional functionality.

As described above, embodiments are directed to a method for wireless packet capture using a mobile communication device. The method comprises launching an application on a mobile communication device, wherein the application provides a user interface for providing a user with various selections to make regarding wireless packet capture and for receiving user input regarding wireless packet capture on the mobile communication device. The method also comprises receiving user input regarding wireless packet capture entered directly into the user interface on the mobile communication device that specifies one or more functions to be performed. The method further comprises capturing wireless packets, processing the captured wireless packets, and storing the processed wireless packets.

The one or more functions to be performed may include placing the mobile communication device into a wireless packet capture mode. The wireless packet capture mode is preferably a mode selected from the group consisting of Normal, Promiscuous, and Radio Frequency Monitor (RFMON). The Normal mode allows wireless packets to be captured only when the mobile communication device is associated with an access point and when the mobile communication device has a destination address associated with a client. The Promiscuous mode allows wireless packets to be captured only when the mobile communication device is associated with an access point, regardless of a destination address. The RFMON mode allows wireless packets to be captured from all access points, clients, and ad-hoc networks transmitted in a particular band, regardless of a destination.

The one or more functions to be performed preferably includes selecting whether to capture wireless packets from an on-board modem or a remote sensor device. The method further comprises detecting an active remote sensor device if the selecting selects capturing wireless packets from the remote sensor device. The capturing wireless packets includes capturing wireless packets through a remote sensor device or through an on-board modem.

The method yet further may comprise downloading the application onto the mobile communication device. Alternatively, instead of an application effecting wireless packet capture downloaded onto a communication device, embodiments herein could utilize a purpose-built communication device.

Embodiments are also directed to a non-transitory computer readable medium storing instructions, executable by a processor, for wireless packet capture using a mobile communication device, by the above method and/or portions thereof.

Although the embodiments described throughout this disclosure utilize a COTS communication device, a non-COTS communication device may alternatively be employed in any of the embodiments.

In any of the above embodiments, instead of an application effecting wireless packet capture downloaded onto a communication device, embodiments may utilize a purpose-built communication device, i.e., where the communication device includes the functions of the application already built into the communication device.

The contemplated modifications and variations specifically mentioned above are considered to be within the spirit and scope of the present invention.

Those of ordinary skill in the art will recognize that various modifications and variations may be made to the embodiments described above without departing from the spirit and scope of the present invention. It is therefore to be understood that the present invention is not limited to the particular embodiments disclosed above, but it is intended to cover such modifications and variations as defined by the following claims.

The invention claimed is:

1. A method for wireless packet capture using a mobile communication device, comprising:
    launching an application on a mobile communication device, wherein the application provides a user interface for providing a user with various selections to make regarding wireless packet capture and for receiving user input regarding wireless packet capture on the mobile communication device;
    receiving user input regarding wireless packet capture entered directly into the user interface on the mobile communication device that specifies one or more functions to be performed;
    capturing wireless packets, wherein the captured wireless packets are transmitted over a network from a third party and are addressed for receipt by the communication device or another communication device;
    processing the captured wireless packets; and
    storing the processed wireless packets.

2. The method of claim 1, wherein the one or more functions to be performed includes placing the mobile communication device into a wireless packet capture mode.

3. The method of claim 1, wherein the user input comprises selecting whether to capture the wireless packets from an on-board modem or from a remote sensor device.

4. The method of claim 1, further comprising transmitting the processed wireless packets.

5. The method of claim 4, wherein the mobile communication device transmits the processed wireless packets over a network to a second mobile communication device.

6. The method of claim 1, wherein the processing further comprises filtering the captured wireless packets.

7. The method of claim 1 further comprising downloading the application onto the mobile communication device.

8. The method of claim 1, wherein the mobile communication device is a commercial off-the-shelf (COTS) mobile communication device.

9. The method of claim 1, wherein the capturing wireless packets includes capturing wireless packets through a remote sensor device.

10. The method of claim 1, wherein the capturing wireless packets includes capturing wireless packets through an on-board modem.

11. A method for wireless packet capture using a mobile communication device, comprising:
    launching an application on a mobile communication device, wherein the application provides a user interface for providing a user with various selections to make regarding wireless packet capture and for receiving user input regarding wireless packet capture on the mobile communication device;
    receiving user input regarding wireless packet capture entered directly into the user interface on the mobile communication device that specifies one or more functions to be performed, wherein the one or more functions to be performed includes placing the mobile communication device into a wireless packet capture mode and the wireless packet capture mode is a mode selected from the group consisting of Normal, Promiscuous, and Radio Frequency Monitor (RFMON);
    capturing wireless packets;
    processing the captured wireless packets; and
    storing the processed wireless packets.

12. The method of claim 11, wherein the Normal mode allows wireless packets to be captured only when the mobile communication device is associated with an access point and when the mobile communication device has a destination address associated with a client.

13. The method of claim 11, wherein the Promiscuous mode allows wireless packets to be captured only when the mobile communication device is associated with an access point, regardless of a destination address.

14. The method of claim 11, wherein the RFMON mode allows wireless packets to be captured from all access points, clients, and ad-hoc networks transmitted in a particular band, regardless of a destination.

15. A method for wireless packet capture using a mobile communication device, comprising:
    launching an application on a mobile communication device, wherein the application provides a user interface for providing a user with various selections to make regarding wireless packet capture and for receiving user input regarding wireless packet capture on the mobile communication device;
    receiving user input regarding wireless packet capture entered directly into the user interface on the mobile communication device that specifies one or more functions to be performed, wherein the one or more functions to be performed includes selecting whether to capture wireless packets from an on-board modem or a remote sensor device capturing wireless packets;
processing the captured wireless packets; and
storing the processed wireless packets.

16. The method of claim 15 further comprising:
detecting an active remote sensor device if the selecting selects capturing wireless packets from the remote sensor device.

17. A non-transitory computer readable medium storing instructions, executable by a processor, for wireless packet capture using a mobile communication device, by:
launching an application on a mobile communication device, wherein the application provides a user interface for providing a user with various selections to make regarding wireless packet capture and for receiving user input regarding wireless packet capture on the mobile communication device;
receiving user input regarding wireless packet capture entered directly into the user interface on the mobile communication device that specifies one or more functions to be performed, wherein the captured wireless packets are transmitted over a network from a third party and are addressed for receipt by the communication device or another communication device;
capturing wireless packets;
processing the captured wireless packets; and
storing the processed wireless packets.

18. The non-transitory computer readable medium of claim 17, wherein the one or more functions to be performed includes placing the mobile communication device into a wireless packet capture mode.

19. The non-transitory computer readable medium of claim 17 further comprising downloading the application onto the mobile communication device.

20. The non-transitory computer readable medium of claim 17, wherein the mobile communication device is a commercial off-the-shelf (COTS) mobile communication device.

21. The non-transitory computer readable medium of claim 17, wherein the capturing wireless packets includes capturing wireless packets through a remote sensor device.

22. The non-transitory computer readable medium of claim 17, wherein the capturing wireless packets includes capturing wireless packets through an on-board modem.

23. A non-transitory computer readable medium storing instructions, executable by a processor, for wireless packet capture using a mobile communication device, by:
launching an application on a mobile communication device, wherein the application provides a user interface for providing a user with various selections to make regarding wireless packet capture and for receiving user input regarding wireless packet capture on the mobile communication device;
receiving user input regarding wireless packet capture entered directly into the user interface on the mobile communication device that specifies one or more functions to be performed, wherein the one or more functions to be performed includes placing the mobile communication device into a wireless packet capture mode and the wireless packet capture mode is a mode selected from the group consisting of Normal, Promiscuous, and Radio Frequency Monitor (RFMON);
capturing wireless packets;
processing the captured wireless packets; and
storing the processed wireless packets.

24. The non-transitory computer readable medium of claim 23, wherein the Normal mode allows wireless packets to be captured only when the mobile communication device is associated with an access point and when the mobile communication device has a destination address associated with a client.

25. The non-transitory computer readable medium of claim 23, wherein the Promiscuous mode allows wireless packets to be captured only when the mobile communication device is associated with an access point, regardless of a destination address.

26. The non-transitory computer readable medium of claim 23, wherein the RFMON mode allows wireless packets to be captured from all access points, clients, and ad-hoc networks transmitted in a particular band, regardless of a destination.

27. A non-transitory computer readable medium storing instructions, executable by a processor, for wireless packet capture using a mobile communication device, by:
launching an application on a mobile communication device, wherein the application provides a user interface for providing a user with various selections to make regarding wireless packet capture and for receiving user input regarding wireless packet capture on the mobile communication device;
receiving user input regarding wireless packet capture entered directly into the user interface on the mobile communication device that specifies one or more functions to be performed, wherein the one or more functions to be performed includes selecting whether to capture wireless packets from an on-board modem or a remote sensor device;
capturing wireless packets;
processing the captured wireless packets; and
storing the processed wireless packets.

28. The non-transitory computer readable medium of claim 27 further comprising:
detecting an active remote sensor device if the selecting selects capturing wireless packets from the remote sensor device.

* * * * *